W. SAWYER.
Dynamo Electric Machine.

No. 227,845. Patented May 18, 1880.

WITNESSES.
Leonard Sawyer.
Robt Street

INVENTOR.
Wm Sawyer

UNITED STATES PATENT OFFICE.

WILLIAM SAWYER, OF NEW YORK, N. Y.

DYNAMO-ELECTRIC MACHINE.

SPECIFICATION forming part of Letters Patent No. 227,845, dated May 18, 1880.

Application filed February 16, 1880.

*To all whom it may concern:*

Be it known that I, WILLIAM SAWYER, a citizen of the United States, residing at New York, in the county of New York and State of New York, have invented certain new and useful Improvements in Dynamo-Electric Machines; and I do hereby declare that the following is a full, clear, and exact description of the invention, which will enable others skilled in the art to which it appertains to make and use the same.

Dynamo-electric machines and their operation are so well understood at the present day that I have deemed it superfluous to enter into a minute description of the same. The great difficulty with all such generators of electricity is their liability to heat, and thereby to greatly increase their resistance, if not to burn the insulating material in which the wires are incased.

The principal object of my invention is to prevent this electrical heating.

Figure 1:
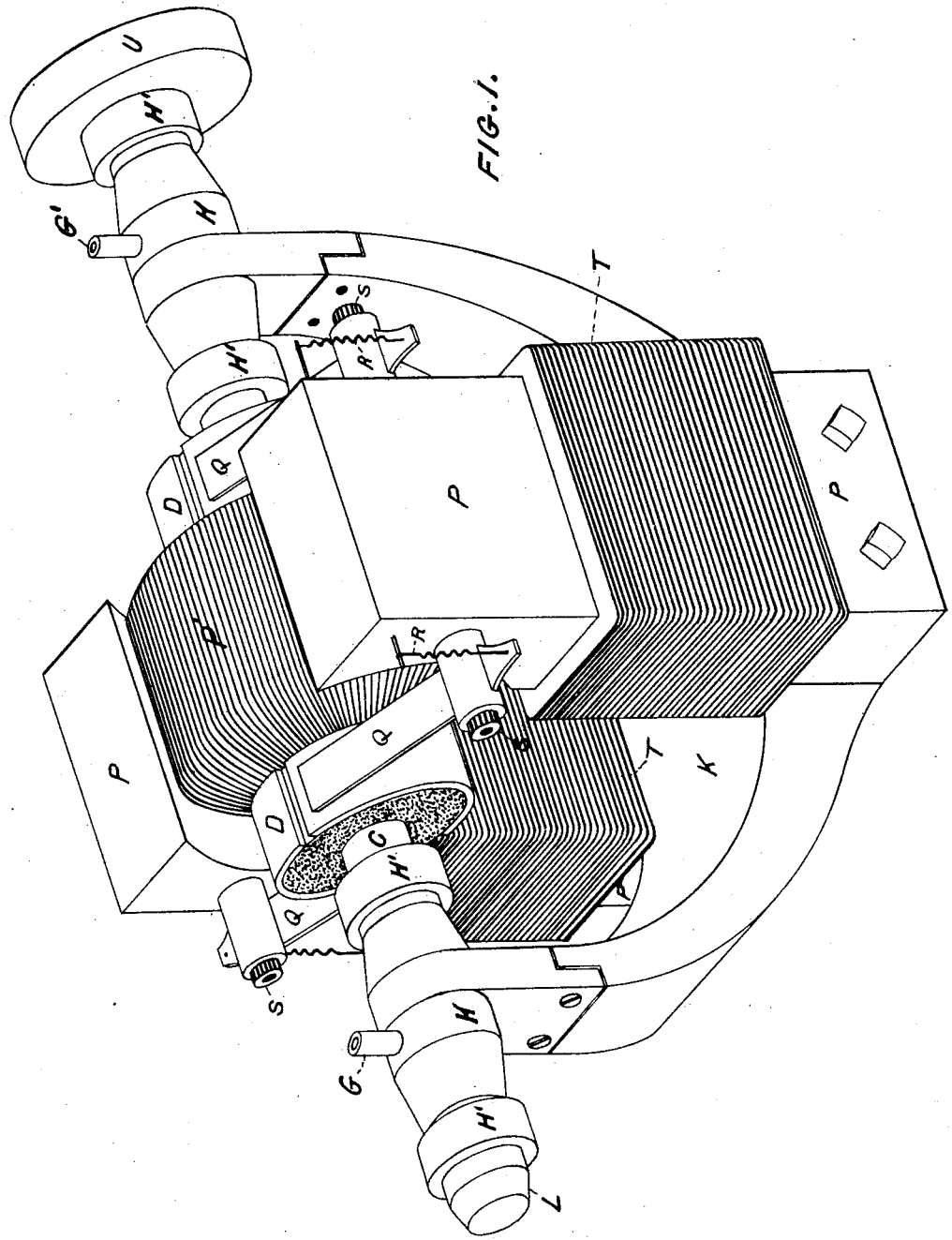
Figure 2:
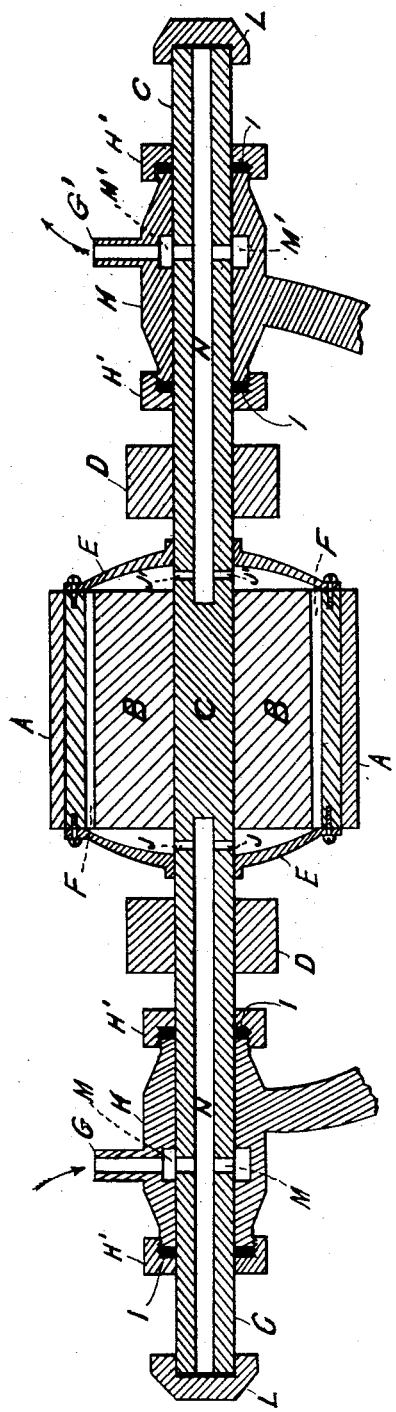
Figure 3:
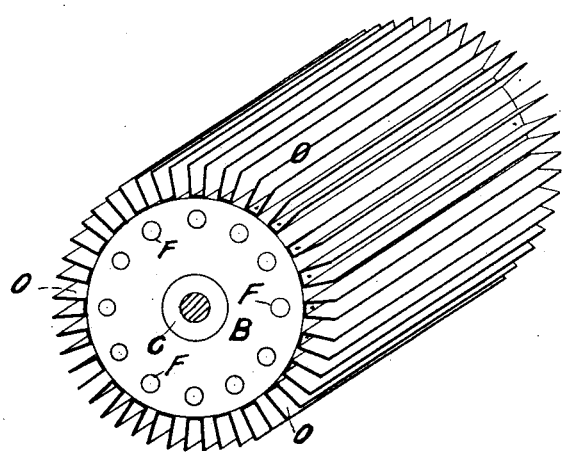
Figure 4:
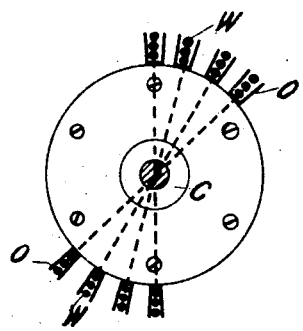

Referring to the drawings accompanying and constituting a part of this specification, Figure 1 is a perspective view of the machine, and Figs. 2, 3, and 4 are other views of parts of the same.

Like letters indicate like parts in all the drawings.

P P are the two limbs of an electro-magnet bolted to the back piece, K. P' is the wire-wound armature.

The drawings are intended to represent what is known as the "new Siemens machine," in so far as the magnet and its armature are concerned, D D being the rotating insulated commutators, and Q Q Q Q the brushes on stud S, held to their bearings by springs R, from which the current is taken, T being the magnet-coils.

I have not deemed it necessary to show the method of electrically connecting up the machine, for the reason that I do not confine my invention to the Siemens or any particular machine; and my invention, being applicable to any machine, has no specific relation to this one, and does not consist in any particular part of any dynamo-machine electrically considered.

The shaft C, working in the bearings H in the offsets from the magnet back piece, K, is caused to rotate by a belt (not shown) passing over pulley U, as will be comprehended without further description.

In other dynamo-machines cooling of the parts has been attempted mainly either by running water through the shaft or by rotating the armature in water. The latter method is, for several readily-appreciated reasons, objectionable, and in the former, the non-conducting material incasing the wires being an equally good non-conductor of heat, the efficiency of the device is questionable.

Radiation by means of great exposure of surface has also been attempted; but this, too, has its objections, principally on account of the increased power required to drive the machine.

Through the armature B, Fig. 2, I pass a shaft, C, hollowed, as shown, and I screw to the ends of the armature iron caps E, made water-tight by any of the well-known devices for that purpose. This armature is perforated throughout its length by holes F, Fig. 3, and these holes open into the spaces between the armature and the caps E. An opening, G, admits water, which is carried to the shaft C through the annular space M, and, flowing along the space N, leaves the shaft through the openings J on one side, and, traversing the perforations F, again reaches the hollow shaft upon the opposite side of the armature by way of the openings J', leaving the shaft by way of the annular space M' and exit-tube G'.

To close the ends of the shaft I employ screw-caps L. To make the water-joints of the journal-bearings tight I employ the screw-caps H', packed with cotton-waste or other like material, I.

The result of the constant passage of water through the perforations F is to cool the armature, (and I remark that I may cool the magnet P in a similar manner,) and thereby to prevent undue heating; but as, owing to the non-conducting character of the insulating covering of the wire with which the armature is wound, the outer layers (shown in Fig. 4) would not be cooled by the water passing through the armature, I have resorted to the device shown in Figs. 3 and 4, the same being U-shaped pieces of copper or other metal, O, screwed or pinned to or in any other manner held to the armature B, in the spaces of which are wound the wires W. Being a good conductor, these U-shaped pieces rapidly convey the heat generated in all the layers of the wire to the armature, whence it is carried off by the flowing water.

I do not, however, in this application claim the heat-conducting pieces O, as that feature of the invention is to be made the subject of a separate patent.

Having thus fully described my invention, what I claim as such, and desire to secure by Letters Patent, is—

1. In a dynamo-electric machine, the combination, with a running stream of water, of an armature, B, perforated with holes F.

2. In a dynamo-electric machine, the combination of an armature having perforations for the passage of a stream of water with water-tight caps E, substantially as and for the purpose set forth.

3. In a dynamo-electric machine, the combination of an armature, B, a hollow shaft provided with an opening at one end of said armature and another opening at the other end of said armature, with two or more openings, F, through said armature, substantially as shown and described.

WM. SAWYER.

Witnesses:
ROBT. STREET,
G. C. THATCHER.